US009863375B2

(12) United States Patent
Takakura et al.

(10) Patent No.: US 9,863,375 B2
(45) Date of Patent: Jan. 9, 2018

(54) DEVICE AND METHOD FOR DIAGNOSING EVAPORATED FUEL PROCESSING DEVICE

(71) Applicant: NISSAN MOTOR CO., LTD., Yokohama-shi, Kanagawa (JP)

(72) Inventors: Shinsuke Takakura, Yokohama (JP); Isao Otsu, Sagamihara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 231 days.

(21) Appl. No.: 14/380,539

(22) PCT Filed: Mar. 5, 2013

(86) PCT No.: PCT/JP2013/055898
§ 371 (c)(1),
(2) Date: Aug. 22, 2014

(87) PCT Pub. No.: WO2013/133234
PCT Pub. Date: Sep. 12, 2013

(65) Prior Publication Data
US 2015/0020780 A1    Jan. 22, 2015

(30) Foreign Application Priority Data

Mar. 9, 2012   (JP) .................................. 2012-052519

(51) Int. Cl.
*F02M 25/08*      (2006.01)
*F02D 41/14*      (2006.01)
(Continued)

(52) U.S. Cl.
CPC ....... *F02M 25/0854* (2013.01); *B60K 15/035* (2013.01); *F02D 41/0045* (2013.01);
(Continued)

(58) Field of Classification Search
CPC ........... F02M 25/0854; F02M 25/0809; F02M 25/0836; F02M 25/089; B60K 15/035;
(Continued)

(56) References Cited

U.S. PATENT DOCUMENTS 5,239,824 A * 8/1993 Matsumoto ........... F01N 3/2033
60/283
5,251,477 A * 10/1993 Nakashima ........ F02M 25/0809
73/114.39
(Continued)

FOREIGN PATENT DOCUMENTS

JP        H04-132868 A     5/1992
JP        H04-262047 A     9/1992
(Continued)

*Primary Examiner* — David Hamaoui
(74) *Attorney, Agent, or Firm* — Drinker Biddle & Reath LLP

(57) ABSTRACT

An evaporated fuel processing apparatus includes a blocking valve configured to selectively allow and shut off communication between a canister and a fuel tank, and adsorbs evaporated fuel by the canister by opening the blocking valve during fuel filling, wherein the evaporated fuel occurs in the fuel tank, and performs a purge operation of introducing purge gas into an intake air line of an internal combustion engine with the blocking valve closed while the internal combustion engine is operating, wherein the purge gas contains a fuel component released from the canister. A diagnostic apparatus is configured to diagnose whether or not the blocking valve is abnormal, based on sensing of evaporated fuel flowing through the blocking valve while the purge operation is being performed.

11 Claims, 4 Drawing Sheets

(51) Int. Cl.
*F02D 41/00* (2006.01)
*B60K 15/035* (2006.01)

(52) U.S. Cl.
CPC ..... *F02D 41/1456* (2013.01); *F02M 25/0809* (2013.01); *F02M 25/089* (2013.01); *F02M 25/0836* (2013.01); *B60K 2015/03514* (2013.01)

(58) Field of Classification Search
CPC ....... B60K 2015/03514; F02D 41/0045; F02D 41/1456
USPC .................................................. 123/518–520
See application file for complete search history.

(56) References Cited

U.S. PATENT DOCUMENTS

| | | | | |
|---|---|---|---|---|
| 5,592,923 A * | 1/1997 | Machida | ............ | F02M 25/0809 123/520 |
| 5,767,395 A * | 6/1998 | Goto | ................... | F02M 25/0809 123/520 |
| 6,467,463 B2 * | 10/2002 | Kitamura | ........... | F02M 25/0809 123/516 |
| 7,017,558 B2 * | 3/2006 | Osanai | ............... | F02M 25/0827 123/198 D |
| 7,316,225 B2 * | 1/2008 | Murakami | ......... | F02M 25/0818 123/516 |
| 2004/0250805 A1 * | 12/2004 | Osanai | .................. | F02D 41/004 123/698 |
| 2012/0152210 A1 * | 6/2012 | Reddy | ................. | F02M 25/089 123/520 |

FOREIGN PATENT DOCUMENTS

| | | |
|---|---|---|
| JP | 2005-248911 A | 9/2005 |
| JP | 4140345 B2 | 8/2008 |

* cited by examiner

DEVICE AND METHOD FOR DIAGNOSING EVAPORATED FUEL PROCESSING DEVICE

TECHNICAL FIELD

The present invention relates to an evaporated fuel processing apparatus that employs a canister to process evaporated fuel occurring in a fuel tank during fuel filling, and relates particularly to a diagnostic apparatus and a diagnostic method for diagnosing whether or not a blocking valve is abnormal wherein the blocking valve is disposed between the fuel tank and the canister.

BACKGROUND ART

An evaporated fuel processing apparatus has been widely used, which is configured to: temporarily adsorb evaporated fuel in a canister for preventing the evaporated fuel from flowing to the outside, wherein the evaporated fuel occurs in a fuel tank of a vehicle, and the canister is made of an adsorbent such as activated carbon; and thereafter purge a fuel component from the canister by introduction of fresh air and introduce the fuel component into an intake air line of an internal combustion engine while the internal combustion engine is operating.

A patent document 1 discloses an evaporated fuel processing apparatus which includes a blocking valve in a passage between a fuel tank and a canister, and is configured to adsorb evaporated fuel from the fuel tank into the canister, basically only during fuel filling. This system is configured to maintain the fuel tank in hermetic state by the blocking valve when a vehicle is stationary and no fuel filling is being performed, and thereby more reliably prevent evaporated fuel from flowing to the outside.

The evaporated fuel processing apparatus according to patent document 1 is provided with a diagnostic apparatus for diagnosing whether or not the blocking valve is in a failed open state in which the blocking valve is fixed in open state and cannot be closed. This diagnostic apparatus includes a negative pressure pump connected to a drain port side of the canister, and depressurizes an inside of a system by the negative pressure pump with controlling the blocking valve into closed state in suitable timing while the vehicle is stationary, and diagnoses whether or not the blocking valve is in a failed open state, based on a pressure change in a fuel tank side region or a canister side region at that time.

However, the conventional diagnostic apparatus is configured to perform the diagnosis after operation of the vehicle is stopped. Accordingly, it is necessary to monitor pressure changes with the system of the evaporated fuel processing apparatus maintained in hermetic state, so that the diagnosis cannot be successively performed while an internal combustion engine is operating.

Moreover, the conventional diagnostic apparatus requires a pressurization/depressurization means such as an electric pump, and therefore is not applicable to an evaporated fuel processing apparatus provided with no pressurization/depressurization means.

PRIOR ART DOCUMENT(S)

Patent Document(s)

Patent Document 1: Japanese Patent No. 4140345

SUMMARY OF THE INVENTION

A diagnostic apparatus according to the present invention is provided for an evaporated fuel processing apparatus, wherein the evaporated fuel processing apparatus includes a blocking valve configured to selectively allow and shut off communication between a canister and a fuel tank, and adsorbs evaporated fuel by the canister by opening the blocking valve during fuel filling, wherein the evaporated fuel occurs in the fuel tank, and performs a purge operation of introducing purge gas into an intake air line of an internal combustion engine with the blocking valve closed while the internal combustion engine is operating, wherein the purge gas contains a fuel component released from the canister. The diagnostic apparatus is configured to diagnose whether or not the blocking valve is abnormal, based on sensing of evaporated fuel flowing through the blocking valve while the purge operation is being performed.

When the blocking valve is abnormal such that the blocking valve is closed with a sealing failure or the blocking valve is fixed in an open state where a valve element is fixed in an open position under the condition where the blocking valve is controlled toward closed state, evaporated fuel occurring in the fuel tank leaks to the canister side via the blocking valve. When no purge operation is being performed, the adsorbed amount in the canister gradually increases, but it is difficult to precisely sense evaporated fuel leaking via the blocking valve, because no active gas movement occurs in the system including the canister under this condition.

In contrast, while the purge operation is being performed, a negative pressure in the intake air line of the internal combustion engine acts on the canister, and thereby causes a flow of gas through the canister. Namely, the negative pressure serves to introduce air (atmospheric air in general) into the canister, so that the air flows through the canister, and is mixed with a fuel component released from the canister to produce so-called purge gas which flows from the canister into the intake air line of the internal combustion engine. If the blocking valve fails to be closed due to failure, the application of the negative pressure to the canister results in applying a negative pressure to the fuel tank side via the blocking valve, so that a relatively large amount of evaporated fuel flows into the canister, and further flows into the intake air line of the internal combustion engine. Accordingly, when the purge operation is being performed, the amount of evaporated fuel increases more significantly due to the open-state failure of the blocking valve, and thereby can be sensed more accurately, as compared to the condition where no purge operation is being performed.

Since the diagnosis for the blocking valve according to the present invention is based on the condition where the internal combustion engine is operating and the purge operation is being performed, the diagnosis can be performed while the internal combustion engine is operating, as a matter of course, and moreover, can be successively or repeatedly while the purge operation is being performed.

Therefore, according to the present invention, it is possible to perform an abnormality diagnosis for the blocking valve while the internal combustion engine is operating, and sense the open-state failure of the blocking valve precisely with no pressurization/depressurization means such as electric pump.

MODE(S) FOR CARRYING OUT THE INVENTION

Figure 1:
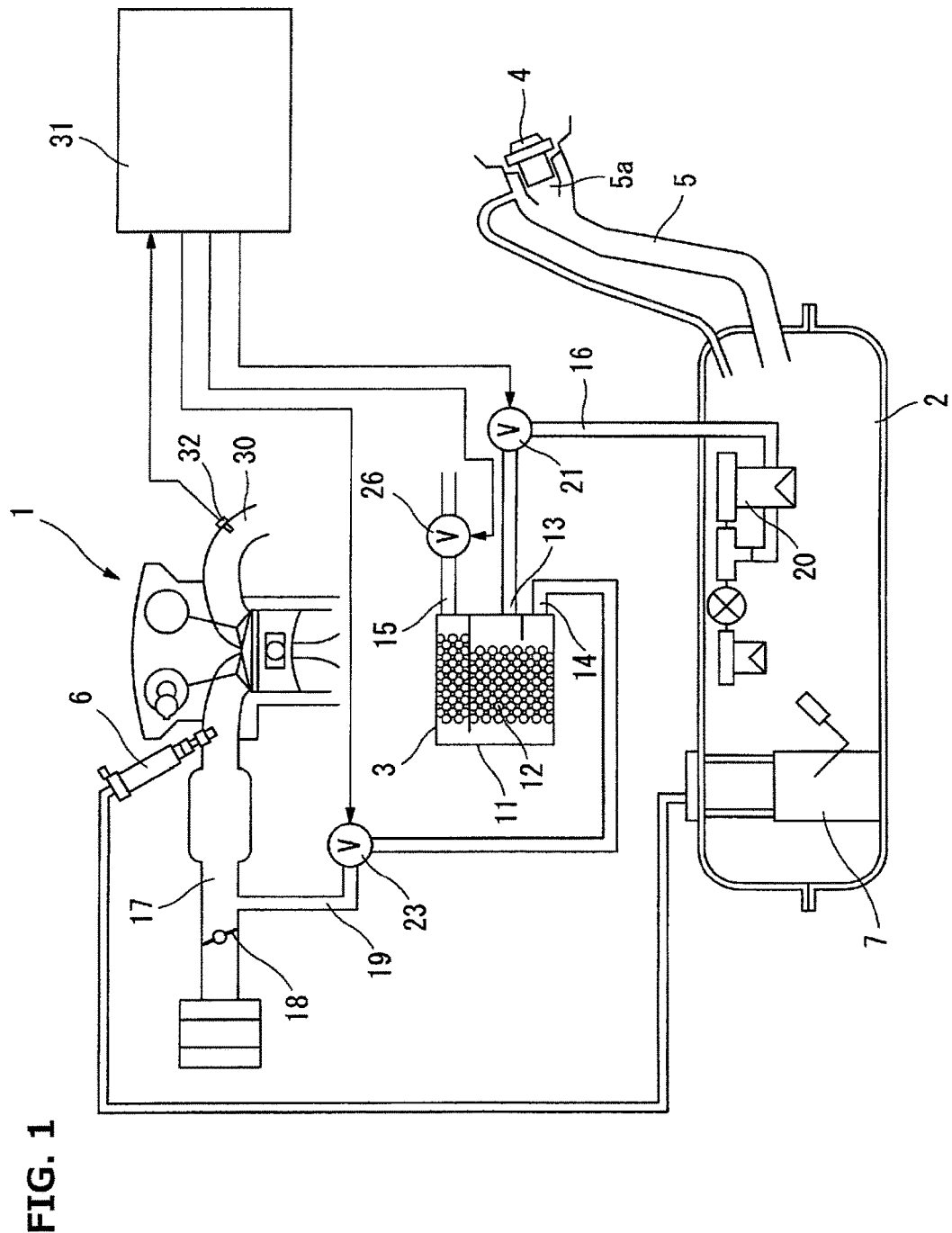
FIG. 1 is a configuration diagram showing an embodiment of an evaporated fuel processing apparatus provided with a diagnostic apparatus according to the present invention.

FIG. 1 is a configuration diagram showing an embodiment of an evaporated fuel processing apparatus provided with a diagnostic apparatus according to the present invention. An internal combustion engine 1 is mounted on a vehicle not shown which is provided with a fuel tank 2 of a hermetic type, and is provided with an evaporated fuel processing apparatus which employs a canister 3 for processing evaporated fuel occurring in fuel tank 2 during fuel filling. The fuel tank 2 includes a filler pipe part 5 having a filler opening 5a at its tip, wherein a filler cap 4 is attached detachably to filler opening 5a. A fuel pump unit 7 is mounted in fuel tank 2 for supplying fuel to a fuel injection device 6 of internal combustion engine 1.

The canister 3 includes an U-shaped flow path formed by a case 11 made of synthetic resin, and is filled therein with an adsorbent 12 made of activated carbon or the like. One end portion of the U-shaped flow path in the flow direction is provided with a charge port 13 serving as a part where evaporated fuel inflows and a purge port 14 serving as a part where purge gas including a fuel component outflows. The other end of the U-shaped flow path in the flow direction is provided with a drain port 15 for introducing outside air during purging.

The charge port 13 is connected to an upper space of fuel tank 2 via an evaporated fuel passage 16. The end portion of the evaporated fuel passage 16 closer to fuel tank 2 is communicated with the upper space of fuel tank 2 via an FLV valve 20 which prevents liquid fuel from moving into evaporated fuel passage 16 when the level of fuel is high. An intermediate point of the evaporated fuel passage 16 is provided with a blocking valve 21 that selectively opens and closes the evaporated fuel passage 16. The blocking valve 21 serves to shut off communication between canister 3 and fuel tank 2 and thereby bring the fuel tank 2 into hermetic state, basically when no fuel filling is performed. Blocking valve 21 is implemented by a normally closed electromagnetic valve which is closed when de-energized.

The purge port 14 is connected via a purge passage 19 to an intake air line of internal combustion engine 1, for example, connected to a downstream side of an intake air passage 17 with respect to a throttle valve 18. The purge passage 19 is provided with a purge control valve 23 which controls introduction of purge gas into internal combustion engine 1. Purge control valve 23 is configured to inhibit introduction of purge gas in a specific situation such as a situation before internal combustion engine 1 is warmed up or a situation of fuel cutoff. The purge control valve 23 is also implemented by a normally closed electromagnetic valve. The purge control valve 23 may be selectively opened and closed simply by on-off control, or may be controlled by duty ratio control such that the flow rate of purge gas can be changed continuously.

The drain port 15 is connected to a drain passage 25 whose distal end is opened to the atmosphere. The drain passage 25 is provided therein with a drain cutoff valve 26 that selectively opens and closes the drain passage 25. The drain cutoff valve 26 is implemented by a normally opened electromagnetic valve which is opened when de-energized. The drain cutoff valve 26 is closed, for example, while a leakage diagnosis is performed with the entire system set in hermetic state, and when breakthrough of canister 3 (namely, a condition where the amount of evaporated fuel has exceeded the capacity of the canister so that a further amount of evaporated fuel cannot be adsorbed) is detected by some means. However, drain cutoff valve 26 is usually in open state to open the drain passage 25.

The blocking valve 21, purge control valve 23, and drain cutoff valve 26 are controlled suitably by an engine control unit 31 which performs various controls of internal combustion engine 1 (fuel injection quantity control, fuel injection timing control, ignition timing control, opening control of throttle valve 18, etc.). As described below, engine control unit 31 performs an adsorption processing during fuel filling, a purge processing during operation, a diagnosis for the open-state failure of blocking valve 21, etc. An air fuel ratio sensor 32 is disposed in an exhaust gas passage 30 of internal combustion engine 1 for sensing an exhaust gas air fuel ratio of internal combustion engine 1. The air fuel ratio sensor 32 may be a so-called oxygen sensor or a wide-area type air fuel ratio sensor.

The fuel injection quantity of fuel injection device 6 is feedback-controlled such that the exhaust gas air fuel ratio sensed by the air fuel ratio sensor 32 conforms to a target air fuel ratio such as a theoretical air fuel ratio. Specifically, a necessary air fuel ratio feedback correction coefficient $\alpha$ is calculated based on a sensing signal from air fuel ratio sensor 32, and is multiplied by a basic fuel injection quantity to obtain a corrected fuel injection quantity. When purge gas containing a fuel component flows into the intake air line, the exhaust gas air fuel ratio becomes richer, and thereby the air fuel ratio feedback correction coefficient $\alpha$ becomes smaller, wherein the air fuel ratio feedback correction coefficient $\alpha$ decreases as the concentration of the fuel component increases under the assumption that the flow rate (volumetric flow rate) of the purge gas introduced through the purge control valve 23 is constant. Accordingly, it is possible to estimate the concentration of the fuel component of purge gas based on the air fuel ratio feedback correction coefficient $\alpha$. In the present embodiment, the concentration of the fuel component of purge gas is referred to as "purge A/F". The purge A/F is defined as a mass of air in purge gas divided by a mass of the fuel component in purge gas.

The evaporated fuel processing apparatus configured as described above is configured to basically adsorb in canister 3 only evaporated fuel occurring during fuel filling, and maintains fuel tank 2 in hermetic state except during fuel filling. When engine control unit 31 recognizes a fuel filling situation, for example, based on operation of a fuel lid opener not shown (a mechanism for opening and closing a lid of a vehicle body which covers the filler opening 5a), purge control valve 23 is closed, and blocking valve 21 is opened, allowing communication between the inside of fuel tank 2 and the charge port 13 of canister 3, under the condition that drain cutoff valve 26 is opened. Accordingly, evaporated fuel occurring in fuel tank 2 during fuel filling is introduced into canister 3, and is adsorbed by adsorbent 12 of canister 3.

Upon termination of the fuel filling, blocking valve 21 is brought into closed state. Accordingly, the inside of fuel tank 2 is maintained in hermetic state, separated from canister 3, so that the adsorbed amount in canister 3 is unchanged basically when internal combustion engine 1 is at rest. When operation of the vehicle is started and internal combustion engine 1 is brought into a predetermined operation state, purge operation for a fuel component from canister 3 is performed by suitably opening the purge control valve 23 while maintaining the blocking valve 21 closed. Namely, the atmospheric air is introduced through the drain port 15 by a difference in pressure from the intake air line of internal combustion engine 1, so that the fuel component purged from adsorbent 12 by the atmospheric air forms a purge gas introduced into intake air passage 17 of internal combustion engine 1 via the purge control valve 23. Accordingly, while internal combustion engine 1 is operating, the adsorbed amount in canister 3 decreases gradually. The evaporated fuel processing apparatus is configured to allow adsorption in canister 3 only during fuel filling, basically. However, when the pressure of fuel tank 2 becomes significantly high due to temperature change or the like during operation of internal combustion engine 1, blocking valve 21 may be configured to be temporarily opened exceptionally. In such a case, evaporated fuel moving to canister 3 via blocking valve 21 flows from charge port 13 to the adjacent purge port 14 through a shortcut, and then is directly introduced into intake air passage 17 of internal combustion engine 1, so that the evaporated fuel is little adsorbed in adsorbent 12 of canister 3.

In this way, in the evaporated fuel processing apparatus described above, communication between canister 3 and fuel tank 2 is allowed only during fuel filling, and fuel tank 2 is brought into hermetic state except during fuel filling. This serves to suppress leakage of evaporated fuel to the outside to a significantly low level.

In the present embodiment, a self-diagnosis is performed while internal combustion engine 1 is operating, whether or not evaporated fuel passage 16 is sufficiently closed when blocking valve 21, which is a normally closed electromagnetic valve, is in closed state, namely, whether or not blocking valve 21 is in a failed open state (a state of open-state failure), in order to ensure intended performance of the evaporated fuel processing apparatus. The open-state failure of blocking valve 21 includes a sealing failure when blocking valve 21 is in closed state, due to meshing with a foreign object, and a failed condition where a valve element is fixed in an open position.

Figure 2:
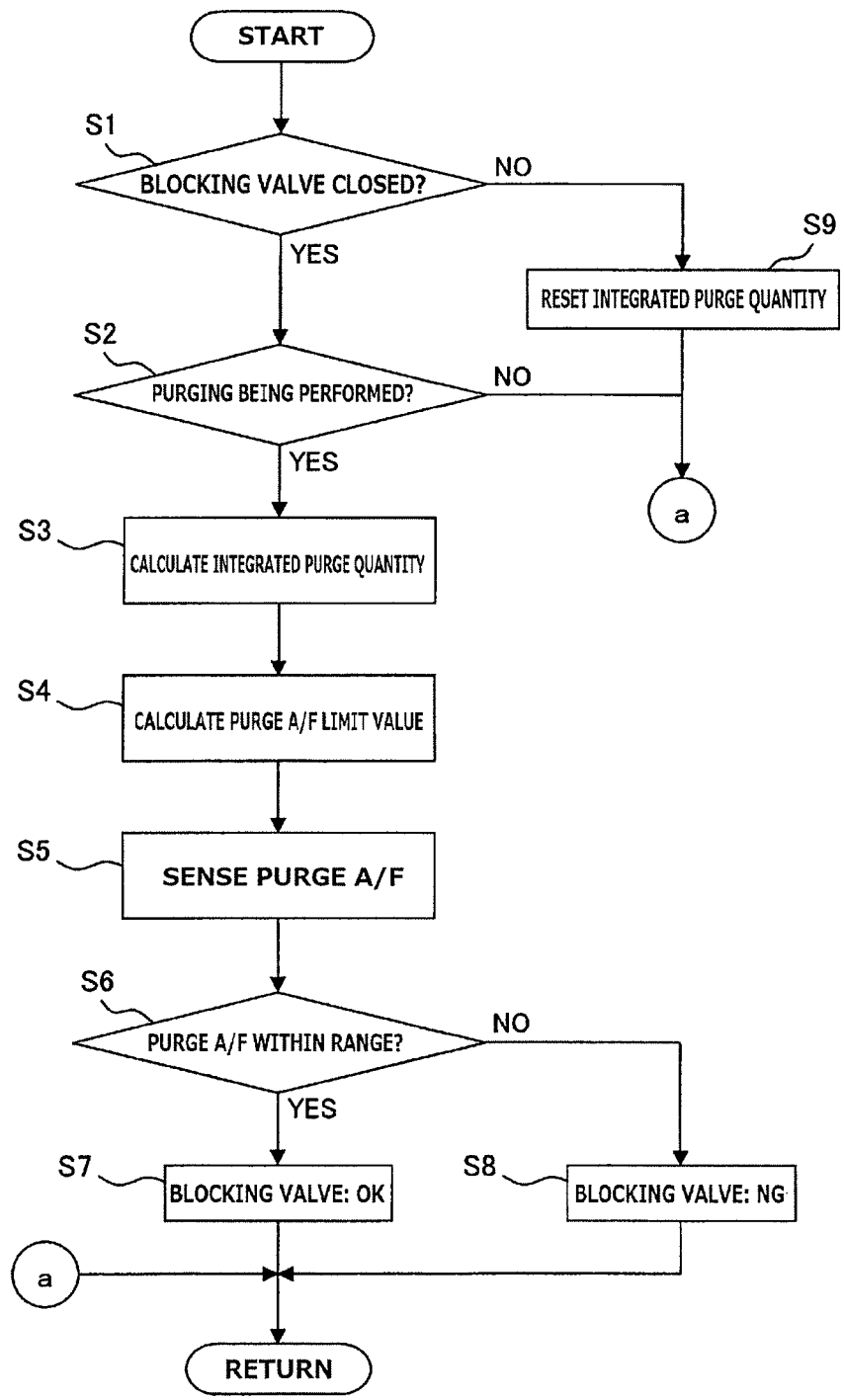
FIG. 2 is a flow chart showing a flow of diagnosis processing according to the embodiment.

FIG. 2 is a flow chart showing a flow of diagnosis process for the open-state failure. The following describes the flow chart of FIG. 2 with reference to a time chart of FIG. 3. This process is repeatedly performed at constant intervals, for example. First, at Step 1, engine control unit 31 determines whether or not blocking valve 21 is in closed state. As described above, blocking valve 21 is opened during fuel filling, and is closed usually except during fuel filling. When blocking valve 21 is in closed state, engine control unit 31 proceeds to Step 2 where engine control unit 31 determines whether or not the purge operation is being performed. As described above, the purge operation is implemented by introducing purge gas into the intake air line of internal combustion engine 1 via purge control valve 23, when internal combustion engine 1 is in a predetermined operating state. The purge operation is performed basically when internal combustion engine 1 is operating in a part of an operating region in which the fuel injection quantity is feedback-controlled.

When the purge operation is being performed, engine control unit 31 proceeds to Step 3 where engine control unit 31 calculates an integrated purge quantity (a total quantity of the fuel component released from 3) from the start of the purge operation to the present time. For example, this calculation is implemented by successively integrating the fuel component quantity estimated from the air fuel ratio feedback correction coefficient $\alpha$. For simplicity, the time period during which purge control valve 23 is opened, or the flow rate of purge gas passing through purge control valve 23 may be regarded as indicating the integrated purge quantity. The purge quantity integrated successively at Step 3 is reset at Step 9, when blocking valve 21 is opened. However, in a situation where the purge operation is intermittently performed due to changes of the operating condition or the like, the integrated purge quantity is not reset, but the integration is continued without resetting, when the purge operation is restarted.

At Step 4, engine control unit 31 obtains a fuel component concentration limit, namely, a limit value of purge A/F, as a reference at that time, based on the integrated purge quantity by using a predetermined equation, or by searching a predetermined table. In this embodiment, a lean-side limit value of purge A/F is set as indicated by a broken line AF1 in FIG. 3, and a rich-side limit value of purge A/F is set as indicated by a broken line AF2 in FIG. 3, based on the integrated purge quantity.

Figure 3:
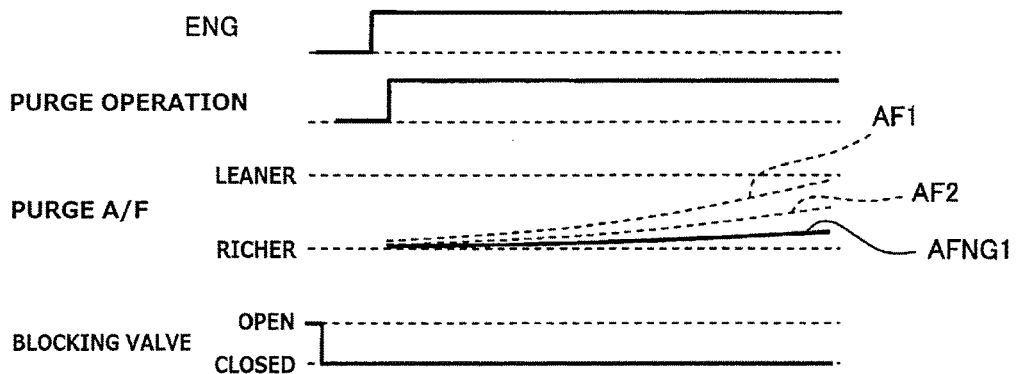
FIG. 3 is a time chart showing how a purge A/F and others change during the diagnosis.

In FIG. 3 with a horizontal axis of time, the fuel component concentration of purge gas flowing from canister 3 to the intake air line is richer at the start of the purge operation, and gradually becomes leaner as the purge operation proceeds, which is a normal characteristic of canister 3. Since this characteristic of change of the fuel component concentration is uniquely determined, the fuel component concentration or purge A/F for reference can be obtained proactively, with respect to the integrated purge quantity. At Step 4, the lean-side limit value AF1 and rich-side limit value AF2 are set with respect to the integrated purge quantity at that time, in account of some allowable possible region, in consideration of variation of an initial adsorbed quantity.

Next, at Step 5, engine control unit 31 obtains an actual purge A/F at this time, based on the air fuel ratio feedback correction coefficient $\alpha$, as described above. Then, at Step 6, engine control unit 31 compares the actual purge A/F with the lean-side limit value AF1 and rich-side limit value AF2. When the actual purge A/F is within the range between the lean-side limit value AF1 and the rich-side limit value AF2, engine control unit 31 determines at Step 7 that blocking valve 21 is closed normally. When the actual purge A/F is out of the range between the lean-side limit value AF1 and the rich-side limit value AF2 (specifically, when the actual purge A/F is richer than the rich-side limit value AF2), engine control unit 31 determines at Step 8 that blocking valve 21 fails to be closed normally.

FIG. 3 shows an example of situation where blocking valve 21 is closed at termination of fuel filling, and thereafter the internal combustion engine 1 is started, and when internal combustion engine 1 reaches a predetermined operating state, the purge operation is started, and the purge operation continues for a sufficiently long period. As shown in FIG. 3, the lean-side limit value AF1 and rich-side limit value AF2 gradually change to the lean side along with the reference purge A/F based on the assumption that blocking valve 21 is closed, as the purge operation proceeds. If blocking valve 21 is closed normally, the actual purge A/F is maintained to be a value between the lean-side limit value AF1 and rich-side limit value AF2.

In contrast, when blocking valve 21 is maintained opened in the state of open-state failure, the intake negative pressure of internal combustion engine 1 acts on purge port 14 of canister 3 via purge control valve 23 and purge passage 19, and further acts on fuel tank 2 via the evaporated fuel passage 16, so that a relatively large amount of evaporated fuel is introduced into the intake air line of internal combustion engine 1 via evaporated fuel passage 16 and purge passage 19. Moreover, as described above, a further amount of evaporated fuel occurring in the fuel tank flows from charge port 13 to the adjacent purge port 14 through a shortcut in canister 3, and then is directly introduced into the intake air line of internal combustion engine 1, so that the further amount of evaporated fuel is little adsorbed in adsorbent 12 of canister 3. Accordingly, when blocking valve 21 is in the state of open-state failure, the purge A/F becomes richer clearly. In FIG. 3, a solid line AFNG1 indicates an example of characteristic of purge A/F when blocking valve 21 is in the state of open-state failure. In this situation where the actual purge A/F is richer than the rich-side limit value AF2, the open-state failure can be identified.

When the purge operation is not being performed, namely, when purge control valve 23 is in closed state, the intake negative pressure does not act on fuel tank 2 even if blocking valve 21 is in the state of open-state failure, so that the fuel component concentration does not significantly increase in purge passage 19 and evaporated fuel passage 16.

In this way, according to the present embodiment, it is possible to diagnose accurately whether not blocking valve 21 is in the state of open-state failure, while internal combustion engine 1 is operating, and it is further possible to perform the diagnosis repeatedly while the purge operation is being performed. Moreover, it is possible to perform the diagnosis of the open-state failure, without the pressurization/depressurization means such as electric pump as in the conventional configuration according to patent document 1.

Although both of the lean-side limit value AF1 and rich-side limit value AF2 are set as limit values for reference in the example shown in FIGS. 2 and 3, it is sufficient to set the rich-side limit value AF2 only, for the diagnosis about the open-state failure of blocking valve 21, as can be understood from FIG. 3. When the actual purge A/F is leaner than the lean-side limit value AF1, it may be determined that some other abnormality such as entrance of outside air into purge passage 19 has occurred.

Figure 4:
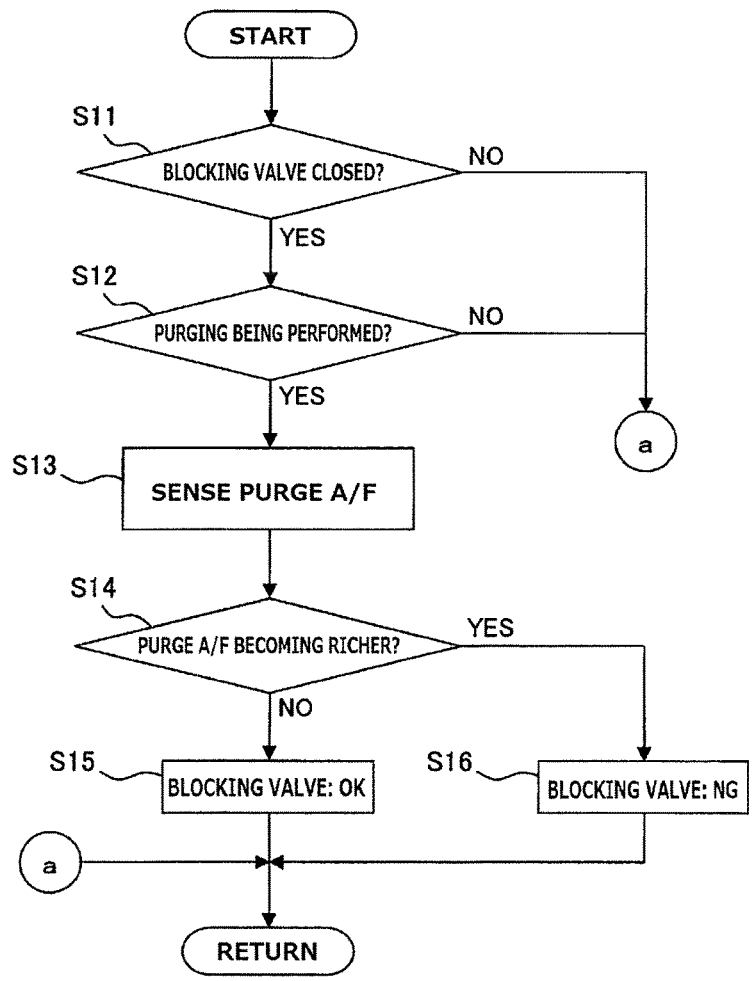
FIG. 4 is a flow chart showing a second example of diagnosis processing.
Figure 5:
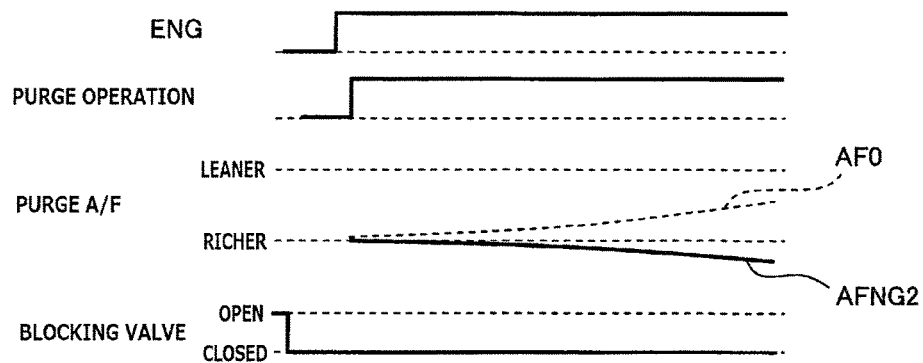
FIG. 5 is a time chart showing how the purge A/F and others change in the second example.

FIGS. 4 and 5 show a modified embodiment in which a part of the diagnostic method based on purge A/F is modified. In this embodiment, engine control unit 31 determines at Step 11 whether or not blocking valve 21 is closed, and determines at Step 12 whether or not the purge operation is being performed, and thereafter obtains the purge A/F at the moment based on the air fuel ratio feedback correction coefficient α at Step 13.

Then, at Step 14, engine control unit 31 obtains an increase or decrease change in the purge A/F, and determines whether or not the purge A/F is becoming richer. This determination can be implemented by comparing the present value of purge A/F with a previous value thereof or obtaining an average gradient of several sampling values. When the purge A/F is becoming richer, engine control unit 31 determines at Step 16 that blocking valve 21 fails to be closed fully, and is in the state of open-state failure. Otherwise, namely, when the purge A/F is becoming leaner or substantially unchanged, engine control unit 31 determines that blocking valve 21 is closed normally.

As shown in FIG. 5, as the purge operation proceeds with blocking valve 21 closed, the purge A/F gradually becomes leaner as indicated by a broken line AF0. In contrast, when the purge A/F based on the exhaust air fuel ratio is becoming richer as indicated by a solid line AFNG2, it is possible to determine that the change of the fuel component concentration is caused by inflow of evaporated fuel from fuel tank 2, irrespective of the magnitude of the purge A/F.

According to the embodiment shown in FIGS. 4 and 5, it is possible to precisely diagnose whether or not blocking valve 21 is in the state of open-state failure, while internal combustion engine 1 is operating, and it is possible to perform the diagnosis repeatedly while the purge operation is being performed, similarly as in the first embodiment. This embodiment is more advantageous in that the diagnosis can be performed without preparation of reference data of purge A/F, as compared to the first embodiment.

The diagnostic method according to the embodiment shown in FIGS. 4 and 5 may be combined with the diagnostic method according to the embodiment shown in FIGS. 2 and 3.

Although it is determined whether or not evaporated fuel passing through the blocking valve 21 is present, based on the exhaust gas air fuel ratio of internal combustion engine 1 (in other words, the air fuel ratio feedback correction coefficient α) in the shown embodiments, the present invention is not so limited. The present invention is based on the principle that when the blocking valve 21 is open while the purge operation is being performed, the negative pressure for purging acts on fuel tank 2 and thereby causes a further amount of evaporated fuel. Accordingly, it may be directly sensed whether or not the amount of evaporated fuel flowing out of fuel tank 2 while the purge operation is being performed has increased.

Figure 6:
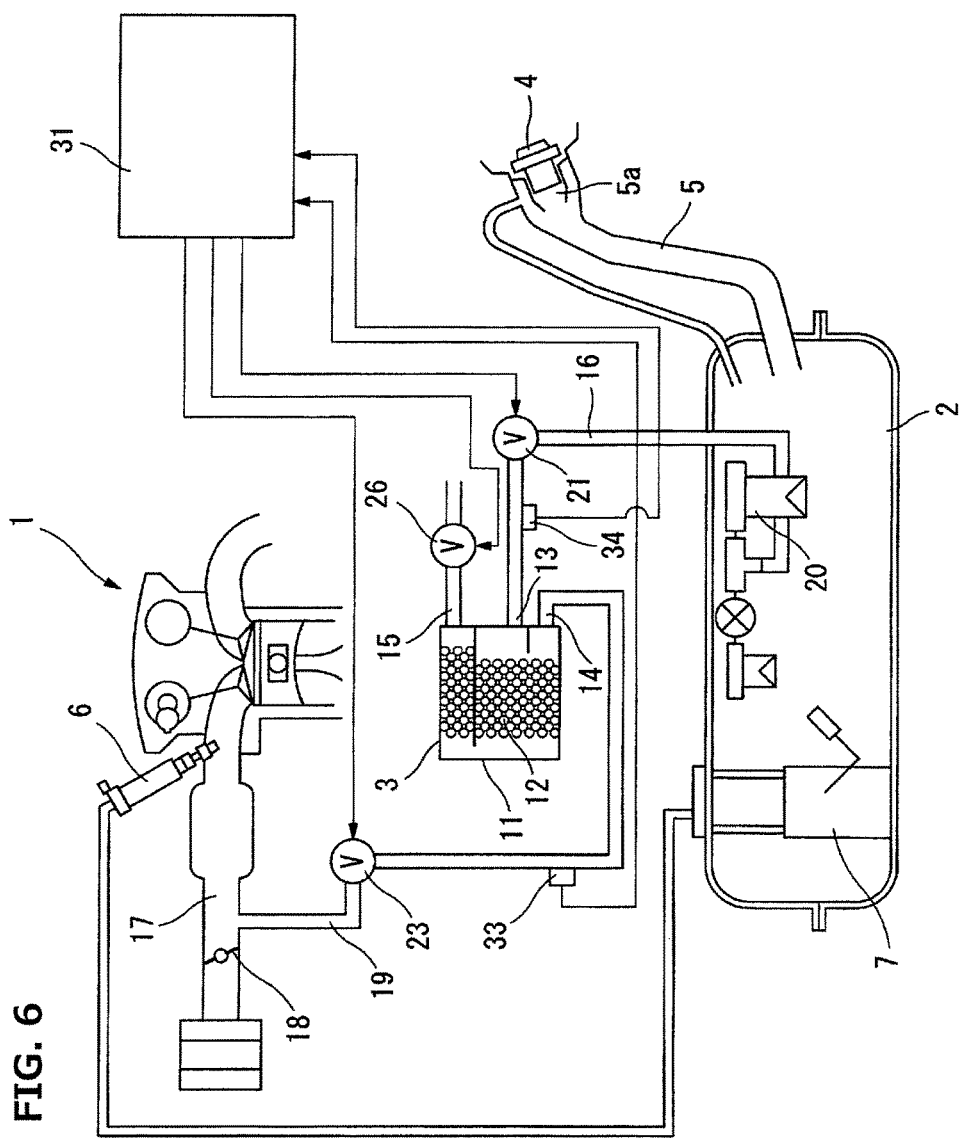
FIG. 6 is a configuration diagram showing an embodiment provided with sensors.

For example, as shown in FIG. 6, it may be configured so that a gas sensor 33 is disposed in purge passage 19 extending from canister 3 to the intake air line of internal combustion engine 1, wherein gas sensor 33 is capable of obtaining an output corresponding to the fuel component concentration of purge gas, and the change of the fuel component concentration resulting from the open-state failure of blocking valve 21 is sensed while the purge operation is being performed, as in the shown embodiments. The gas sensor 33 may be disposed upstream or downstream of purge control valve 23.

For another example, as shown in FIG. 6, it may be configured so that a gas sensor 34 is disposed in evaporated fuel passage 16 extending from fuel tank 2 to canister 3, wherein gas sensor 34 is capable of obtaining an output corresponding to the evaporated fuel component similar to gas sensor 33, and it is determined whether or not the amount of evaporated fuel in evaporated fuel passage 16 is above a certain level while the purge operation is being performed. The gas sensor 34 may be disposed closer to canister 3 with respect to blocking valve 21 as shown in FIG. 6, or may be disposed closer to fuel tank 2 with respect to blocking valve 21.

Although it is possible to perform the diagnosis about the open-state failure of blocking valve 21 by using only one of the gas sensors 33, 34, it may be configured to perform the diagnosis based on sensing at two locations in purge passage 19 and evaporated fuel passage 16 by using both of the gas sensors 33, 34 as shown in FIG. 6.

The invention claimed is:

1. A diagnostic apparatus for an evaporated fuel processing apparatus, wherein the evaporated fuel processing apparatus includes a blocking valve configured to selectively allow and shut off communication between a canister and a fuel tank, and adsorbs evaporated fuel by the canister by opening the blocking valve during fuel filling, wherein the evaporated fuel occurs in the fuel tank, and performs a purge operation of introducing purge gas into an intake air line of an internal combustion engine with the blocking valve closed while the internal combustion engine is operating, wherein the purge gas contains a fuel component released from the canister, wherein the diagnostic apparatus is configured to diagnose whether or not the blocking valve is abnormal, based on sensing of evaporated fuel flowing through the blocking valve while the purge operation is being performed and wherein the diagnostic apparatus is configured to determine whether or not evaporated fuel has passed through the blocking valve, based on concentration of the fuel component of purge gas introduced from the canister into the intake air line and configured to set a fuel component concentration limit successively, wherein the fuel component concentration limit is a reference according to proceeding of the purge operation; and determine that the blocking valve is abnormal, in response to a situation where the sensed concentration of the fuel component is richer than the fuel component concentration limit.

2. The diagnostic apparatus as claimed in claim 1, wherein:

the canister includes a first end and a second end in a flow direction, wherein a charge port and a purge port is arranged at the first end, and a drain port is disposed at the second end;

the charge port is connected to the fuel tank via the blocking valve; and communication between the purge port and the intake air line is allowed, and the drain port is opened to atmospheric air, while the purge operation is being performed.

3. The diagnostic apparatus as claimed in claim 1, wherein:

the internal combustion engine includes an exhaust air fuel ratio sensor configured to sense an exhaust air fuel ratio; and the diagnostic apparatus is configured to determine the concentration of the fuel component of purge gas based on the exhaust air fuel ratio.

4. The diagnostic apparatus as claimed in claim 1, wherein a purge passage is provided with a sensor for sensing the concentration of the fuel component of purge gas, wherein the purge passage extends from the canister to the intake air line.

5. The diagnostic apparatus as claimed in claim 1, wherein the diagnostic apparatus is configured to determine that the blocking valve is abnormal, in response to a situation where the concentration of the fuel component becomes richer as the purge operation proceeds.

6. The diagnostic apparatus as claimed in claim 1, wherein an evaporated fuel passage is provided with a sensor for sensing evaporated fuel, wherein the evaporated fuel passage extends from the fuel tank to the canister.

7. A diagnostic method for an evaporated fuel processing apparatus, wherein the evaporated fuel processing apparatus includes a blocking valve configured to selectively allow and shut off communication between a canister and a fuel tank, and adsorbs evaporated fuel by the canister by opening the blocking valve during fuel filling, wherein the evaporated fuel occurs in the fuel tank, and performs a purge operation of introducing purge gas into an intake air line of an internal combustion engine with the blocking valve closed while the internal combustion engine is operating, wherein the purge gas contains a fuel component released from the canister, wherein the diagnostic method comprises diagnosing whether or not the blocking valve is abnormal, based on sensing of evaporated fuel flowing through the blocking valve while the purge operation is being performed and wherein the diagnostic method comprising determining whether or not evaporated fuel has passed through the blocking valve, based on concentration of the fuel component of purge gas introduced from the canister into the intake air line, setting a fuel component concentration limit successively, wherein the fuel component concentration limit is a reference according to proceeding of the purge operation; and determining that the blocking valve is abnormal, in response to a situation where the sensed concentration of the fuel component is richer than the fuel component concentration limit.

8. The diagnostic apparatus as claimed in claim 1, wherein the diagnostic apparatus is configured to:

sense the concentration of the fuel component of purge gas introduced from the canister into the intake air line while the purge operation is being performed; and determine whether or not evaporated fuel has passed through the blocking valve, based on whether or not the fuel component has increased with respect to a normal value of the concentration of the fuel component for condition that the blocking valve is closed.

9. The diagnostic method as claimed in claim 7, wherein the diagnostic method comprising:

sensing the concentration of the fuel component of purge gas introduced from the canister into the intake air line while the purge operation is being performed; and determining whether or not evaporated fuel has passed through the blocking valve, based on whether or not the fuel component has increased with respect to a normal value of the concentration of the fuel component for condition that the blocking valve is closed.

10. A diagnostic apparatus for an evaporated fuel processing apparatus, wherein the evaporated fuel processing apparatus includes a blocking valve configured to selectively allow and shut off communication between a canister and a fuel tank, and adsorbs evaporated fuel by the canister by opening the blocking valve during fuel filling, wherein the evaporated fuel occurs in the fuel tank, and performs a purge operation of introducing purge gas into an intake air line of an internal combustion engine with the blocking valve closed while the internal combustion engine is operating, wherein the purge gas contains a fuel component released from the canister, wherein the diagnostic apparatus is configured to diagnose whether or not the blocking valve is abnormal, based on sensing of a quantity of evaporated fuel flowing through the blocking valve while the purge operation is being performed and wherein the diagnostic apparatus is configured to determine whether or not evaporated fuel has passed through the blocking valve, based on concentration of the fuel component of purge gas introduced from the canister into the intake air line and configured to set a fuel component concentration limit successively, wherein the fuel component concentration limit is a reference according to proceeding of the purge operation; and determine that the blocking valve is abnormal, in response to a situation where the sensed concentration of the fuel component is richer than the fuel component concentration limit.

11. A diagnostic method for an evaporated fuel processing apparatus, wherein the evaporated fuel processing apparatus includes a blocking valve configured to selectively allow and shut off communication between a canister and a fuel tank, and adsorbs evaporated fuel by the canister by opening the blocking valve during fuel filling, wherein the evaporated fuel occurs in the fuel tank, and performs a purge operation of introducing purge gas into an intake air line of an internal combustion engine with the blocking valve closed while the internal combustion engine is operating, wherein the purge gas contains a fuel component released from the canister, wherein the diagnostic method comprises diagnosing whether or not the blocking valve is abnormal, based on sensing of a quantity of evaporated fuel flowing through the blocking valve while the purge operation is being performed and wherein the diagnostic method comprising determining whether or not evaporated fuel has passed through the blocking valve, based on concentration of the fuel component of purge gas introduced from the canister into the intake air line, and setting a fuel component concentration limit successively, wherein the fuel component concentration limit is a reference according to proceeding of the purge operation; and determining that the blocking valve is abnormal, in response to a situation where the sensed concentration of the fuel component is richer than the fuel component concentration limit.

* * * * *